United States Patent
Okamura

(10) Patent No.: US 6,305,890 B1
(45) Date of Patent: Oct. 23, 2001

(54) COVERING DEVICE FOR NUT AND COVERING DEVICE FOR BOLT HEAD

(75) Inventor: Toshio Okamura, Nishinomiya (JP)

(73) Assignee: Okamura Yugen Gaisha (JP)

( * ) Notice: Subject to any disclaimer, the term of this patent is extended or adjusted under 35 U.S.C. 154(b) by 0 days.

(21) Appl. No.: 09/534,678

(22) Filed: Mar. 24, 2000

Related U.S. Application Data

(63) Continuation of application No. PCT/JP99/01634, filed on Mar. 29, 1999.

(51) Int. Cl.⁷ .............................. F16B 19/00; F16B 33/00; F16B 37/14
(52) U.S. Cl. ........................ 411/431; 411/372.5; 411/377; 411/910; 411/919
(58) Field of Search .............................. 411/372.5, 372.6, 411/373, 377, 429, 431, 910, 919

(56) References Cited

U.S. PATENT DOCUMENTS

| | | | |
|---|---|---|---|
| 3,978,699 | 9/1976 | Triniak | 70/232 |
| 4,867,624 | * 9/1989 | Walley | 411/910 X |
| 5,228,250 | * 7/1993 | Kesselman | 411/910 X |
| 5,730,567 | * 3/1998 | Haseley et al. | 411/432 X |
| 5,803,690 | * 9/1998 | Savinsky | 411/919 X |

FOREIGN PATENT DOCUMENTS

| 1372745 | 11/1994 | (GB) . |
|---|---|---|
| 00/58636 | 10/2000 | (WO) . |

\* cited by examiner

*Primary Examiner*—Neill Wilson
(74) *Attorney, Agent, or Firm*—Morrison Law Firm

(57) ABSTRACT

A nut covering device comprises the following: a cover assembly, including an inner cover, outer cover, and a first constraining mechanism; a second constraining mechanism; and a third constraining mechanism. The first constraining mechanism constrains so that there is no relative motion of the outer cover with respect to the inner cover in an axis direction. The second constraining mechanism constrains so that there is no relative motion of the inner cover with respect to the nut member in the axis direction. The third constraining mechanism constrains so that there is no relative motion of the outer cover with respect to the nut member in the axis direction at least in the removal direction. When a circumferential phase of the inner cover and the outer cover is matched with a predetermined specified phase, second and third constraining mechanisms are released, and the cover assembly can be removed from the nut member.

14 Claims, 17 Drawing Sheets

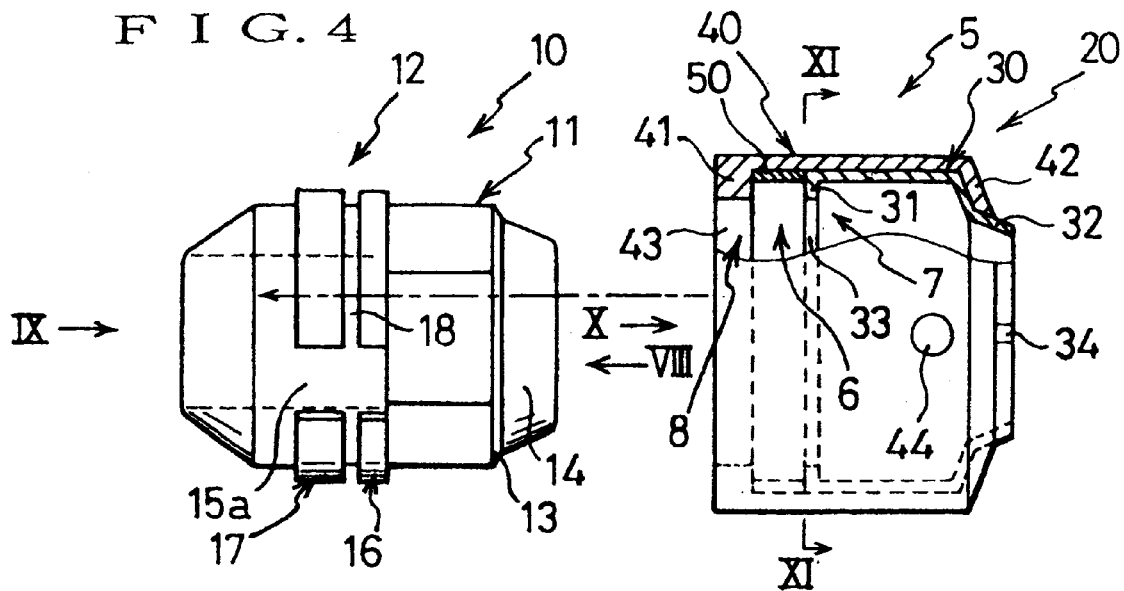
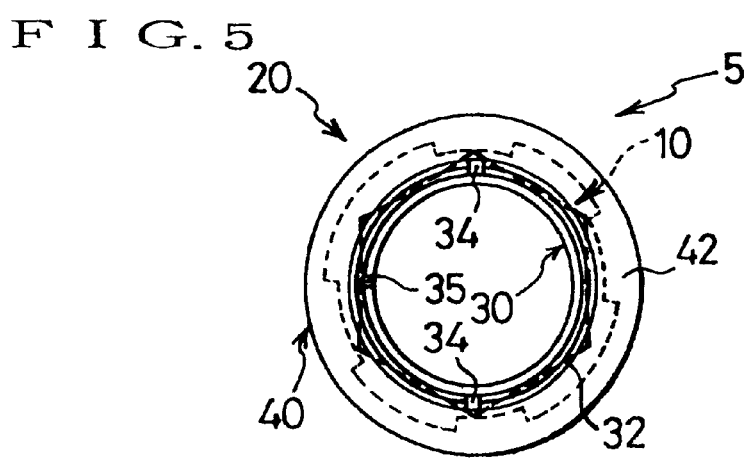
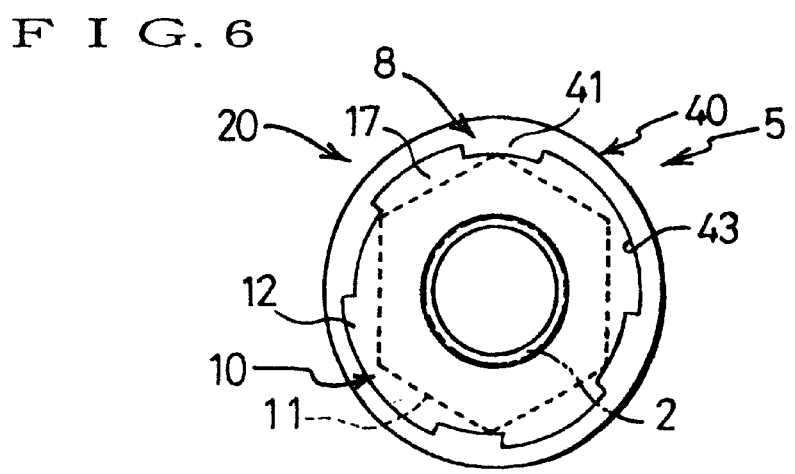

F I G. 1 5
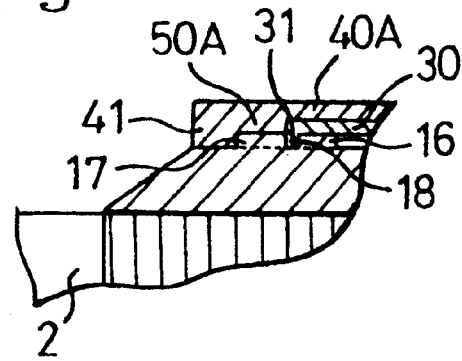
F I G. 1 6
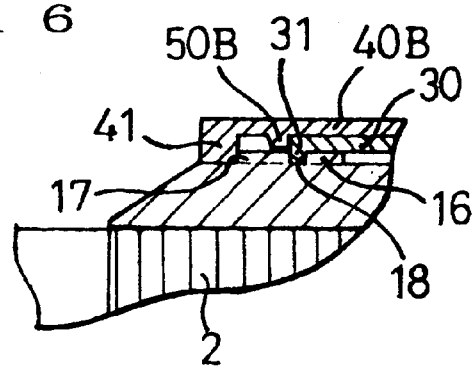
F I G. 1 7
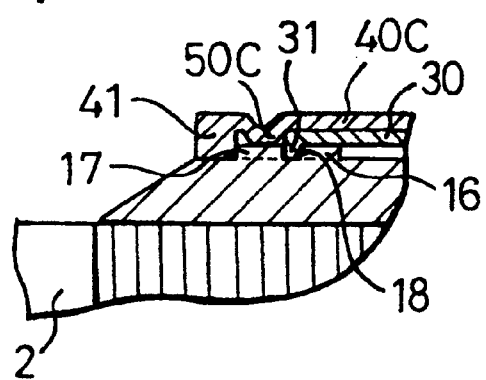

COVERING DEVICE FOR NUT AND COVERING DEVICE FOR BOLT HEAD

This application is a continuation of PCT/99/01634 filed Mar. 29, 1999.

BACKGROUND OF THE PRESENT INVENTION

The present invention relates to a covering device for a nut and a covering device for a bolt head for the purpose of preventing others from unfastening the nut or bolt. More specifically, the present invention relates to technology useful in preventing theft of wheels from cars.

In general, 4–6 bolts are provided on a wheel support member to which a vehicle wheel is attached. The wheel is affixed to the wheel support member via this plurality of bolts. There are constructions where these bolts and nuts project out from the wall surface of the wheel hub. There are also constructions where these bolts and nuts are positioned in the interior of a bolt nut storage cavity on the wheel hub.

In the prior art, hexagon box nuts with tapped holes formed in them and normal hexagon nuts with through tapped holes are used as nuts for axing wheels. Because these nuts can be fastened and loosened using a normal wrench, they are ineffective in preventing the theft of wheels.

Referring to FIGS. 38–40, in the prior art, a nut device for affixing wheels, comprising a special nut 210 with an approximately cylindrical outer perimeter surface and a special wrench tool 215 that can rotate special nut 210, has been put into practical use. On the outer perimeter portion of nut 210, a plurality of vertical grooves 211 is formed irregularly in the circumferential direction. A tube part 216, which can receive nut 210, and a hexagonal part 217, which is for rotating with a normal wrench, are formed on wrench tool 215. A plurality of projection parts 218, which correspond to the plurality of vertical grooves 211, is formed on the inner surface of tube part 216.

With this nut device, special nut 210 can be fastened or loosened with a standard wrench via special wrench tool 215. The circumferential arrangement pattern of the plurality of vertical grooves 211 is not constant. By having a different pattern for each nut device, there can be a plurality of combinations, and a plurality of types of special nut 210 can be used Naturally, for each special nut 210, a special tool 215 is used Four of one type of special nut 210 and one wrench tool 215 that fits these are sold as a set.

However, if the number of types of special nuts 210 and wrench tools 215 is increased, the manufacturing costs become high. As a result, there can not be too many types. In this situation, those who have acquired all the types of wrench tools 215 can unfasten all types of special nut 210 relatively easily, and, as a result, they can steal the wheels.

In Japanese Utility Model Registration Number 2573547, Japanese Examined Utility Model Publication Number 8-30481, Japanese Examined Utility Model Publication Number 7-16095, Japanese Utility Model Registration Number 2559099, and the like, various locking devices for preventing wheel theft have been proposed. However, all of these locking devices have problems of having too many pieces, having complex constructions and high manufacturing costs, and the like.

OBJECT AND SUMMARY OF THE PRESENT INVENTION

It is a first object of the present invention to provide a nut covering device that covers a nut member having various uses, and makes rotation of the nut member impossible.

It is a second object of the present invention is to provide a nut covering device that covers a nut, which is used for affixing a wheel, and makes rotation of the nut impossible.

It is a third object of the present invention is to provide a bolt head covering device that covers a bolt head of a bolt, which has various uses, and makes rotation of the bolt impossible.

Briefly stated, the present invention provides a nut covering device having the following: a cover assembly, including an inner cover, outer cover, and a first constraining mechanism; a second constraining mechanism; and a third constraining mechanism. The first constraining mechanism constrains so that there is no relative motion of the outer cover with respect to the inner cover in an axis direction. The second constraining mechanism constrains so that there is no relative motion of the inner cover with respect to the nut member in the axis direction. The third constraining mechanism constrains so that there is no relative motion of the outer cover with respect to the nut member in the axis direction at least in the removal direction When a circumferential phase of the inner cover and the outer cover is matched with a pre-determined specified phase, second and third constraining mechanisms are released, and the cover assembly can be removed from the nut member.

In the present invention, the covering device covers a nut member screwed onto a bolt and makes rotation of the nut member impossible.

This nut covering device comprises: a cover assembly, which includes a first constraining mechanism and is detachable from the nut member; a second constraining mechanism; and a third constraining mechanism.

The cover assembly comprises: an inner cover, which fits around at least a portion of the nut member in a rotatable manner; an outer cover, which fits around the inner cover in a manner allowing for rotation relative to the inner cover, and the outer cover being also able to cover the outer perimeter of the nut member; a first constraining mechanism which constrains so that there is no movement of the outer cover relative to the inner cover in the axis direction.

The second constraining mechanism constrains so that the inner cover does not move in the axis direction relative to the nut member. The third constraining mechanism cots so that the outer cover does not move at least in the removal direction of the axis direction relative to the nut member.

The construction is such that the constraint by the second and third constraining mechanism is released only when the circumferential phase of the inner cover and outer cover with respect to the nut member matches up with a predetermined specified phase. Only then can the cover assembly be detached from the nut member According to this nut covering device, when the cover assembly is attached to the nut member, if at least one of the second or third constraining mechanism is functioning, the first constraining mechanism, which is an interlocking mechanism, would always function. As a result, the cover assembly cannot be removed from the nut member. It would be impossible for someone who does not know the specified phase to match the inner cover and outer cover, through trial and error, to know the specified phase and to remove the cover assembly from the nut member. In other words, with this nut covering device, the nut member can be covered and rotation can be made impossible. As a result, theft of wheels and the like that are fastened by these nut members can be prevented.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 4 is a side view wherein the special nut and the cover assembly have been taken apart.

FIG. 5 is a view of FIG. 2 from arrow V.

FIG. 6 is a view of FIG. 2 from arrow VI.

FIG. 15 is a cross section of the constraining part and its surrounding area of a modification example.

FIG. 16 is a cross section of the constraining part and its surrounding area of another modification example.

FIG. 17 is a cross section of the constraining part and its surrounding area of another modification example.

DETAILED DESCRIPTION OF THE PREFERRED EMBODIMENTS

Figure 1:
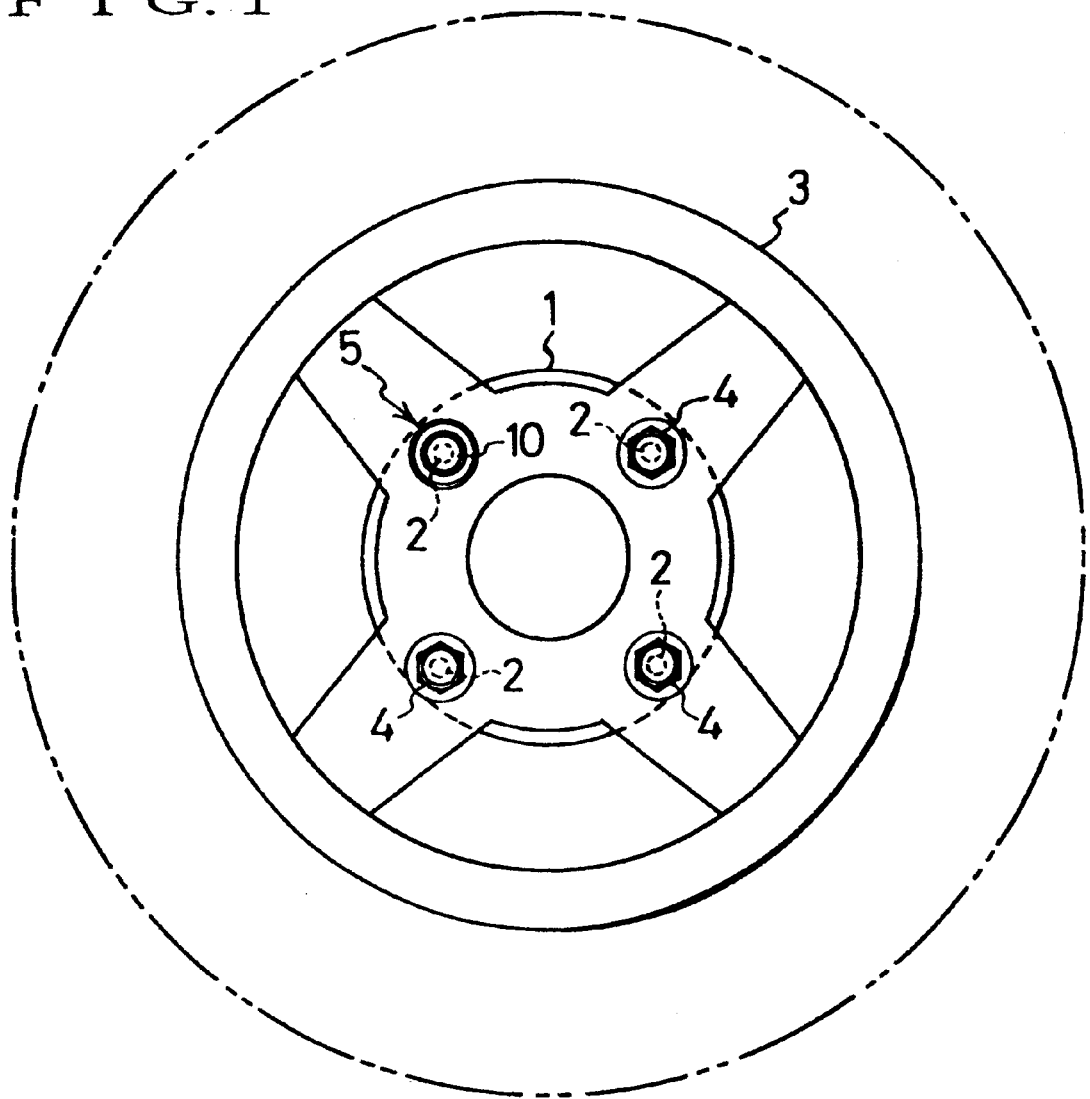
FIG. 1 is a front view of a wheel which uses the nut covering device of the embodiment for the present invention.

Referring to the drawings, the embodiments of the present invention are described below.

Figure 2:
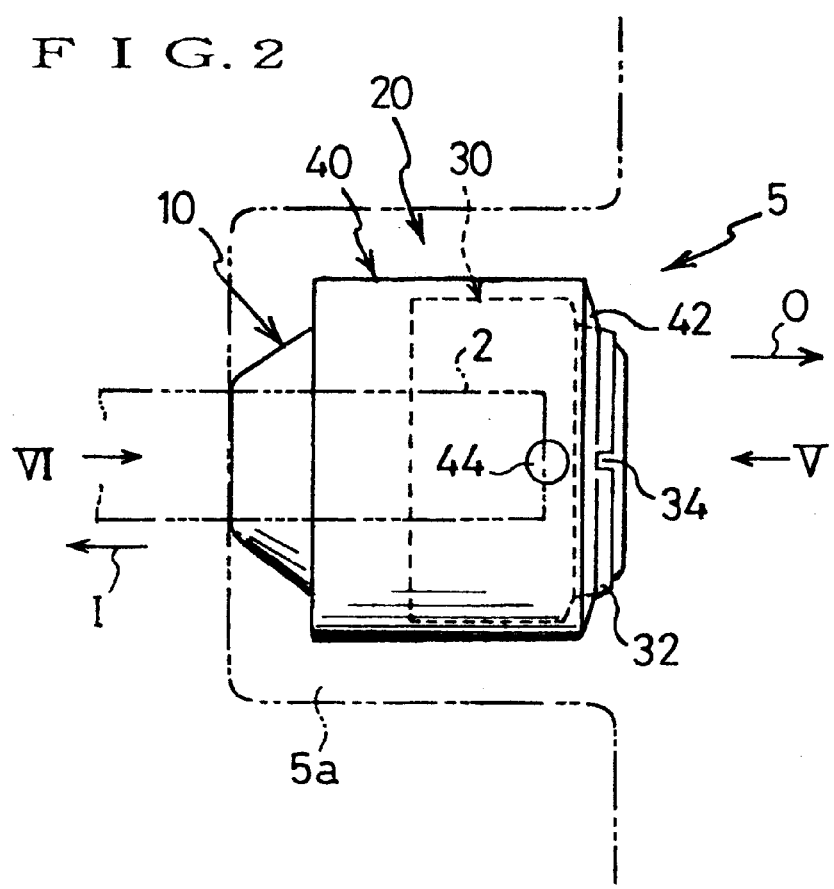
FIG. 2 is a side view of a nut covering device wherein the cover assembly is attached to a special nut
Figure 3:
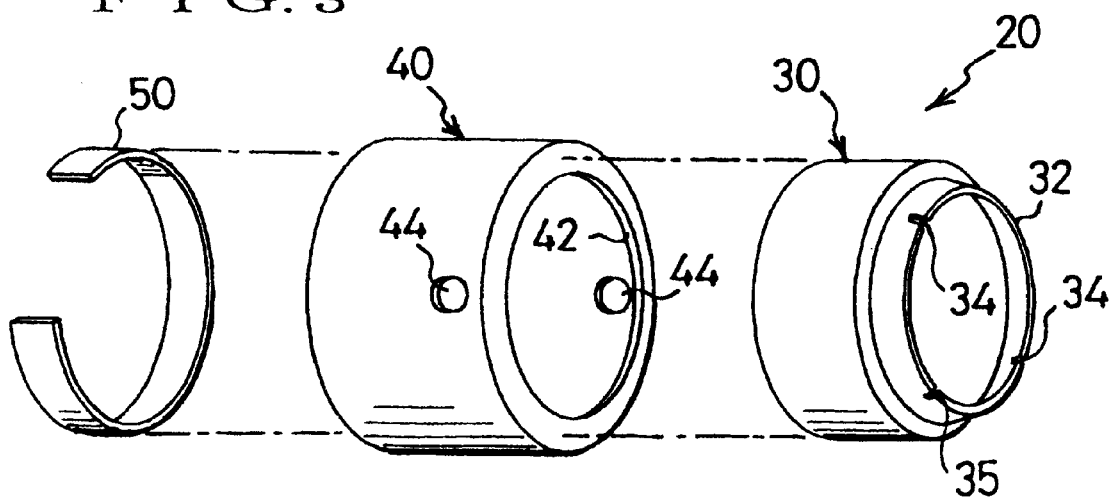
FIG. 3 is an exploded perspective drawing of the cover assembly.

This covering device for a nut is an example of the present invention being applied to a nut that is fastened to a bolt which is used for attaching a wheel of a car. Referring to FIG. 2, the direction of arrow I (the fastening direction when fastening the nut) is the inner direction, and the direction of arrow O (the unfastening direction when unfastening the nut) is the outer direction.

Referring to FIG. 1, four bolts 2 for affixing a wheel are affixed to wheel support member 1 of a car. Bolts 2 are inserted into each of the four bolt holes on a wheel 3. The outer part of each bolt 2 protrudes out into depression 5a. Three of bolts 2 have a general hexagon box nut 4 of a standard nut. A special nut 10 (hereinafter also referred to as nut 10) is fastened to one of bolts 2. A nut covering device 5 of the present invention (hereinafter also referred to as covering device) is used for nut 10. In order to prevent the theft of the wheel, covering device 5 covers nut 10 and makes rotating of nut 10 impossible.

Referring to FIGS. 2–7, covering device 5 is equipped with the following: construction elements (first stopping part 16, second stopping part 17, engaging groove 18, a plurality of notch grooves 15a–15d, the outside end surface of nut 10) to be described later and which are formed on nut 10 which is screwed onto bolt 2; a cover assembly 20, which includes a first constraining mechanism 6; a second constraining mechanism 7; and a third constraining mechanism 8.

Referring to FIGS. 4, 7–9, nut 10 is equipped with the following: a hexagonal nut body 11, which is formed on the outer half of nut 10; a stopping body 12, which is formed more interior than nut body 11 and has a larger diameter than nut body 11; a step 13, and a blind wall 14. Stopping body 12 comprises: four notch grooves 15a–15d, which are formed on the outer perimeter of stopping body 12 in parallel with the bolt axis and are irregular in terms of the circumferential width and/or circumferential spacing; a first stopping part 16, comprising four arc protrusions 16a–16d which have been segmented by four notch grooves 15a–15d; a second stopping part 17, comprising four arc protrusions 17a–17d which are formed interior to first stopping part 16 and are segmented by four notch grooves 25a–15d; a engaging groove 18, which is formed between first stopping part 16 and second stopping part 17 and is approximately circular. However, the number of notch grooves 15a–15d is not limited to 4.

Referring to FIGS. 2–7, FIG. 10, and FIG. 11, cover assembly 20 comprises: a metal inner cover 30, which fits around nut 10 in a manner which allows for rotation relative to nut 10; a metal outer cover 40, which fits around inner cover 30 in a manner which allows for rotation relative to inner cover 30; and a first constraining mechanism 6, which constrains so that outer cover 40 does not move in the axis direction (in the direction of the nut axis) with respect to inner cover 30. Outer cover 40 is formed in a size that is capable of covering approximately all of the outer side of nut 10.

A first catching part 31 is formed at the inner end of inner cover 30. A second catching part 32, which abuts against step 13 and the incline surface of blind wall 14 of nut 10, is formed at the outer end of inner cover 30. Step 13 and the incline surface of blind wall 14 correspond to a portion of the outside end surface of nut 10. A third catching part 41 is formed at the inner end of outer cover 40. A fourth catching part 42, which contacts the outside end surface of second catching part 32, is formed on the outer end of outer cover 40.

Figure 7:
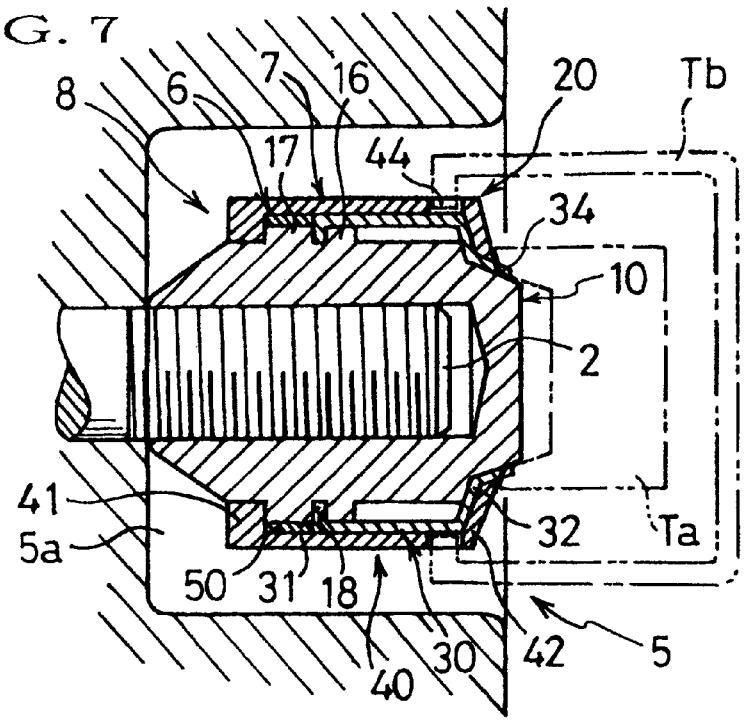
FIG. 7 is a vertical section of the nut covering device when it is attached to a bolt.

Referring to FIGS. 4 and 7, second constraining mechanism 7 constrains the relative movement of inner cover 30 with respect to nut 10 in the axis direction., Second constraining mechanism 7 is equipped with first stopping part 16, second stopping part 17, engaging groove 18, first catching part 31, and second catching part 32. First catching part 31 fits into and engages with engaging groove 18 in a manner which allows for rotation but does not allow for movement in the axis direction. Second catching part 32 contacts and engages with a portion of the outside end surface of nut 10. A passage hole 33, which has approximately the same outer shape as that of stopping body 12, is formed through first catching part 31. As will be described later, passage hole 33 forms a shape that allows for passage of nut 10 and stopping body 12 only when the circumferential phase of first catching part 31 with respect to nut 10 matches one specified phase.

Figure 8:
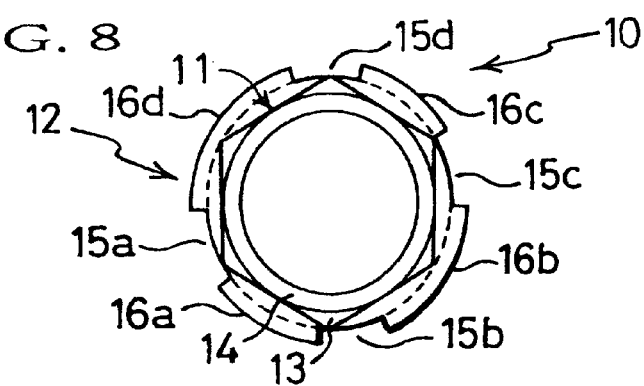
FIG. 8 is a view of FIG. 4 from arrow VIII.
Figure 9:
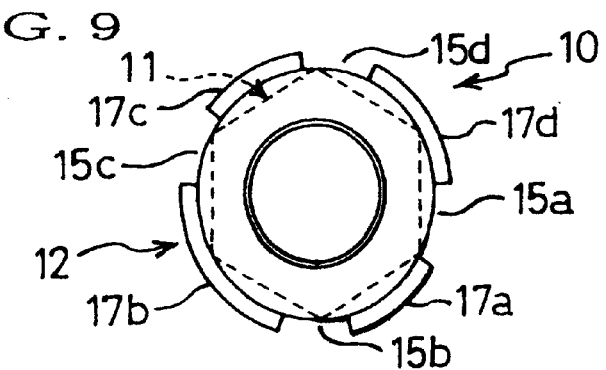
FIG. 9 is a view of FIG. 4 from arrow IX.
Figure 11:
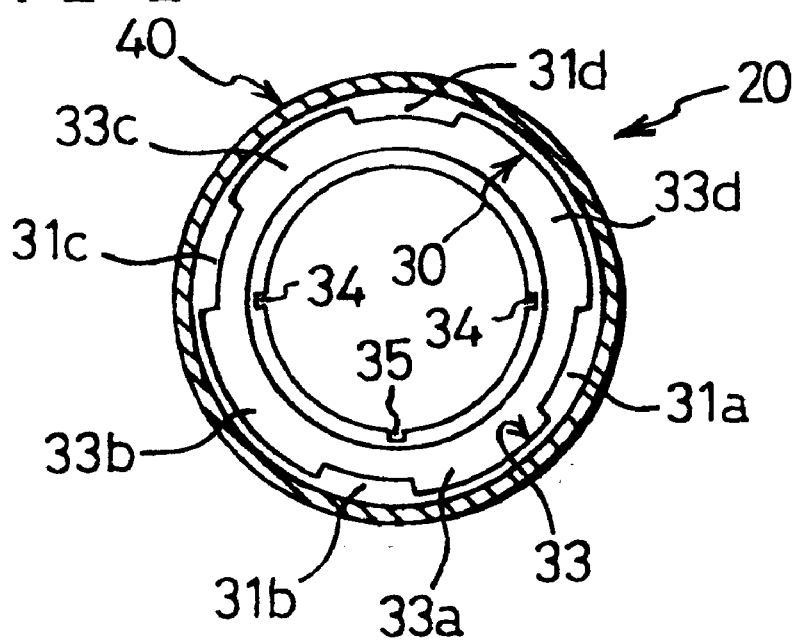
FIG. 11 is a cross section of FIG. 4 along line XI—XI.

Referring to FIGS. 8, 9, 11, the four arc-shaped protrusions 31a–31d of first catching par 31 are formed in shapes that correspond to notch grooves 15a–15d respectively. The four large diameter parts 33a–33d of passage hole 33 are formed in shapes that correspond to the arc-shaped protrusions 16a–16d, 17a–17d respectively.

Referring to FIGS. 4, 6, 7, third constraining mechanism 8 constrains the relative movement in the axis direction, at least in the removal direction (the outer direction of the axis direction), of outer cover 40 with respect to nut 10. Third constraining mechanism 8 is equipped with second stopping part 17 and third catching part 41, which contacts and engages with second stopping part 17 in a rotatable manner. A passage hole 43, which has approximately the same outer shape as that of stopping body 12, is formed through third catching part 41. As will be described later, passage hole 43 forms a shape that allows for passage of nut 10 and stopping body 12 only when the circumferential phase of third catching part 41 with respect to nut 10 matches one specified phase.

Figure 10:
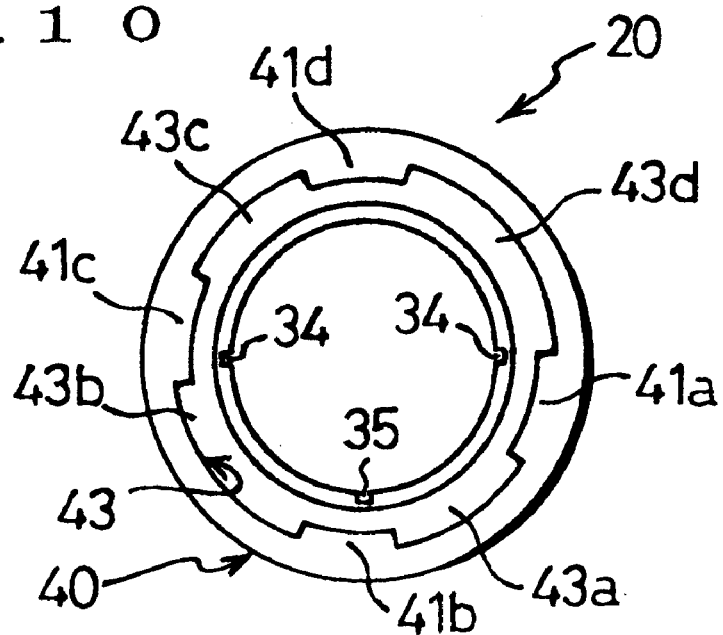
FIG. 10 is a view of FIG. 4 from arrow X.

Referring to FIGS. 8–10, the four arc-shaped protrusions 41a–41d of third catching part 41 are formed in shapes that correspond to notch grooves 15a–15d respectively. The four large diameter parts 43a–43d of passage hole 43 are formed in shapes that correspond to the four arc-shaped protrusions 16a–16d, 17a–17d respectively.

Referring to FIGS. 4 and 7, first constraining mechanism 6 comprises: second catching part 32, third catching part 41, fourth catching part 42, and a constraining member 50 (corresponds to a constraining part), which constrains to prevent the relative movement in the outward direction of inner cover 30 with respect to outer cover 40. Constraining member 50 is constructed from a C-shaped plate spring (refer to FIG. 3). The thickness of this plate spring is the same thickness of a slightly smaller thickness as the tube wall of inner cover 30. Constraining member 50 is built into the interior of outer cover 40 from passage hole 43 of outer cover 40. It is placed between first catching part 31 and third catching part 41 and is attached in a contacting manner to the inner surface of the tube wall of outer cover 40. Constraining member 50 is in contact with first catching part 31 and third catching part 41.

The construction is such that, only when the circumferential phase of inner cover 30 and outer cover 40 with respect to nut 10 matches up with a specified phase that has been established in advance, can the constraints of second constraining mechanism 7 and third constraining mechanism 8 be released and cover assembly 20 be removed from nut 10.

Figure 12:
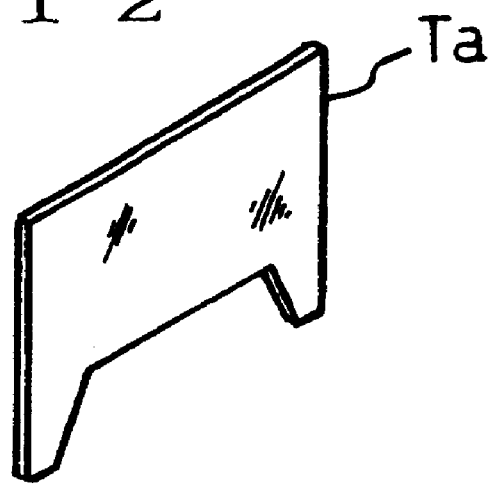
FIG. 12 is a perspective drawing of an operational tool for the inner cover.
Figure 13:
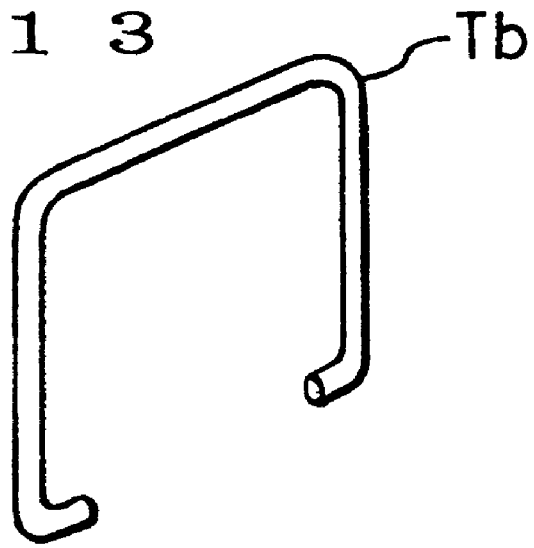
FIG. 13 is a perspective drawing of an operational tool for the outer cover.
Figure 14:
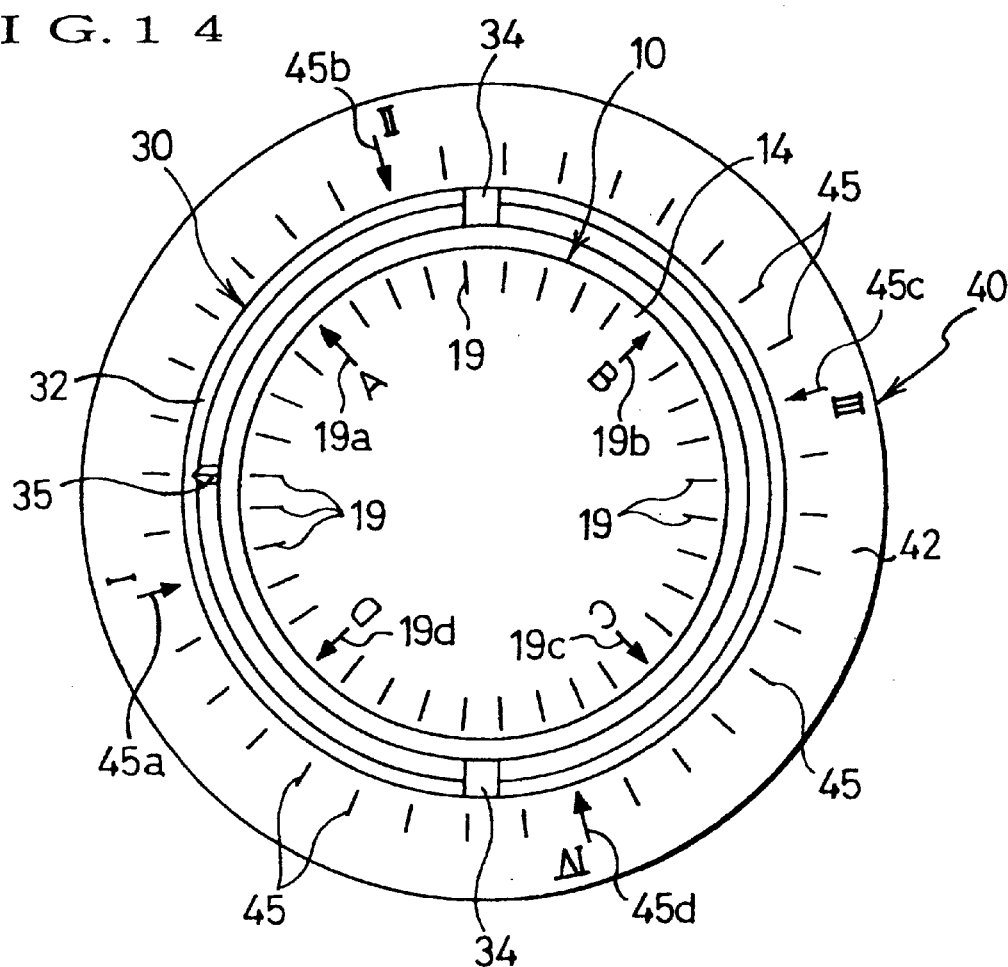
FIG. 14 is an expanded drawing of the nut covering device seen from the outside.

Referring to FIG. 12, an example of an operational tool Ta is shown. A pair of notches 34, which can be used to rotate inner cover 30 from the outside by using operational tool Ta, is formed on the outside end part of inner cover 30. Referring to FIG. 14, an example of an operational tool Tb is shown. A pair of operational holes 44, which can be used to rotate outer cover 41 from the exterior by using operational tool Tb, is formed on outer cover 40.

Next, the indicator marks will be described.

Referring to FIG. 14, on the outer perimeter of the outer end surface of blind wall 14 of nut 10, thirty-six, small, measurement-like indicator marks 19 are stamped by a die at equal intervals. The number of indicator marks 19 is not limited to thirty-six. On nut 10, four arrow marks 19a–19d, which are individually marked with letters A–D for example, are included in indicator marks 19. A single V-notch 35, as the indicator mark equivalent, is formed on the outer end of second catching part 32 of inner cover 30. On the outer end surface of fourth catching part 42 of outer cover 40, thirty-six, small, measurement-like indicator marks 45 are tamped by a die at equal intervals. The number of indicator marks 45 is not limited to thirty-six. On outer cover 40, four arrow marks 45a–45d, which are individually marked with letters I–IV for example, are included in indicator marks 45. Indicator marks 19, V-notch 35, and indicator marks 45 are for determining the circumferential phase relationship of inner cover 30 and outer cover 40 with respect to nut 10.

Referring to FIG. 14, the circumferential phase relationship of nut 10 and inner cover 30 and outer cover 40 that is shown can be described as "D-5, V notch, I-2", for example.

In this case, "D-5" indicates the fifth indicator mark 19 in the clockwise direction from D arrow mark 19d. "V notch" indicates V notch 35. "I-2" indicates the second indicator mark 45 in the clockwise direction from I arrow mark 45a. With nut covering device 5 in this embodiment, if the circumferential phase relationship is set to the specified phase relationship of "D-5, V notch, I-2", four notch grooves 15a–15d matche up with arc-shaped protrusions 16a–16d, 17a–17d respectively. Cover assembly 20 becomes detachable from nut 10.

For nut covering device 5, one set includes one nut 10 and one cover assembly 20. The four sets that are necessary for affixing the four wheels of a car are sold as one unit. In this situation, the four sets of nut covering device 5 have the same construction. The common specified phase relationship "D-5, V notch, I-2" and the Explanatory FIG. and explanatory text are written in the manual.

However, for each unit of nut covering device 5, indicator marks 19 which include the arrow marks, and indicator marks 45 which include the arrow marks, are stamped at characteristic positions, and the specified phase relationship is also characteristic for each unit. In addition, instead of for each unit, each set within a unit can have a particular specified phase relationship.

Next, the fiction of nut covering device 5 will be described.

When attaching wheel 3 to a car, nut 10, onto which cover assembly 20 has not been attached, is tightened using a standard box wrench. Referring to FIGS. 2 and 7, after tightening the nut, cover assembly 20 is attached to nut 10 while having inner cover 30 and outer cover 40 placed in the specified phase relationship with respect to nut 10. In this condition, first catching part 31 matches up with engaging groove 18. Third catching part 41 matches up so that it can engage with the inner end of second stopping part 17. After the attachment, inner cover 30 is rotated an arbitrary angle, and outer cover 40 is rotated a different arbitrary angle.

First constraining mechanism 6, which is an interlocking mechanism, is always functional. Because the circumferential phase of inner cover 30 and outer cover 40 with respect to nut 10 has been changed, second and third constraining mechanisms 7, 8 also become functional. Inner cover 30 and outer cover 40 are in a condition where any movement in the axis direction is impossible. As a result, if another person (someone who does not know the specified phase relationship) tries to steal wheel 3 by trial and error, it would be virtually impossible for the person to match inner cover 30 and outer cover 40 to the specified phase. As a result, the person could not remove cover assembly 20 from nut 10.

For example, even if inner cover 30 happened to match the specified phase, outer cover 40 could not move in the axis direction. As a result, inner cover 30 also could not be moved in the axis direction. As a result, the fact that inner cover 30 matched the specified phase could not be determined. Conversely, even if outer cover 40 happened to match the specified phase, because inner cover 30 could not be moved in the axis direction, outer cover 40 also could not be moved in the axis direction. As a result, the fact that outer cover 40 matched the specified phase could not be determined.

When removing cover assembly 20 from nut 10 when exchanging wheel 3 and the like, while consulting the specified phase relationship described in the manual, both inner cover 30 and outer cover 40 are rotated with operational tools Ta, Tb and the like. They are then placed in the specified phase relationship with respect to nut 10. When this occurs, second and third constraining mechanisms 7, 8 are released, and cover assembly 20 can be removed from nut 10. With covering device 5 with this kind of dependability, theft of wheel 3 can be reliably prevented. Nut covering device 5 has a small number of parts, has a simple construction, is small, and can be manufactured relatively cheaply.

Nut 10, inner cover 30, outer cover 40 can be manufactured by processing steel material by forge molding, rolling molding, press molding, and the like. If needed, joining of parts by welding can also be used. Furthermore, if manufacturing all or part of inner cover 30 and outer cover 40 with a magnesium alloy or the like, this can be manufactured by injection molding. Both inner cover 30 and outer cover 40 can be manufactured by combining a plurality of parts.

Next, modified examples of constraining members or constraining parts that are contained in first constraining mechanism 6 will be described. For members with the same constructions as the members of the previously described embodiment, the same numerals are used, and members with the same functions are given similar numerals.

Referring to FIGS. 15–17, constraining parts 50A, 50B, 50C can be formed in a unitary manner with outer covers 40A, 40B, 40C, respectively.

Figure 18:
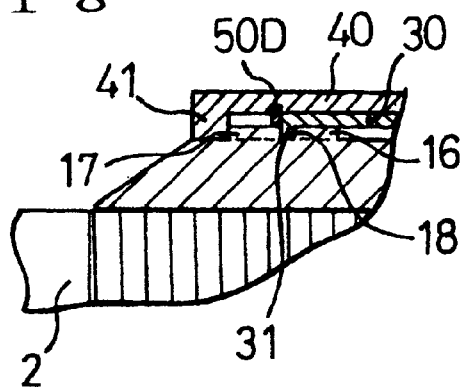
FIG. 18 is a cross section of the constraining part and its surrounding area of another modification example.
Figure 19:
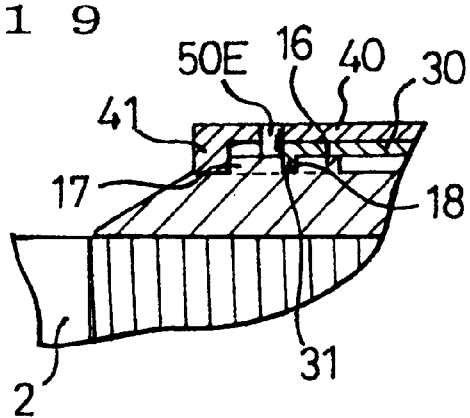
FIG. 19 is a cross section of the constraining part and its surrounding area of another modification example.
Figure 20:
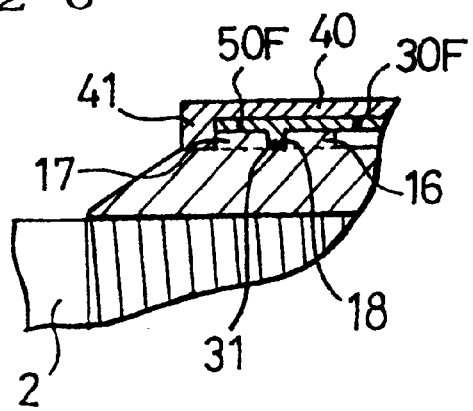
FIG. 20 is a cross section of the constraining part and its surrounding area of another modification example.

Referring to FIG. 18, a constraining member 50D, comprising a stop ring inserted into a circular groove on the inner surface of the tube wall of outer cover 40, is provided. Referring to FIG. 19, a constraining member 50E, comprising a plurality of pins which are inserted and fastened to outer cover 40, is provided. Referring to FIG. 20, a constraining part 50F, which is formed in a unitary manner on inner cover 30F, is provided In order to prevent deformation of both covers 30, 40 due to an external force, cover assembly 20 can be attached to nut 10 while having small pieces of metallic permanent magnets attached to each of the six planar parts of nut body 11. In addition, operational tools Ta, Tb are simply one example, and various operational tools can be used.

Next, various modifications will be described. Members with the same constructions as in the previously described embodiment will be given the same numerals, and the description will be omitted.

Figure 21:
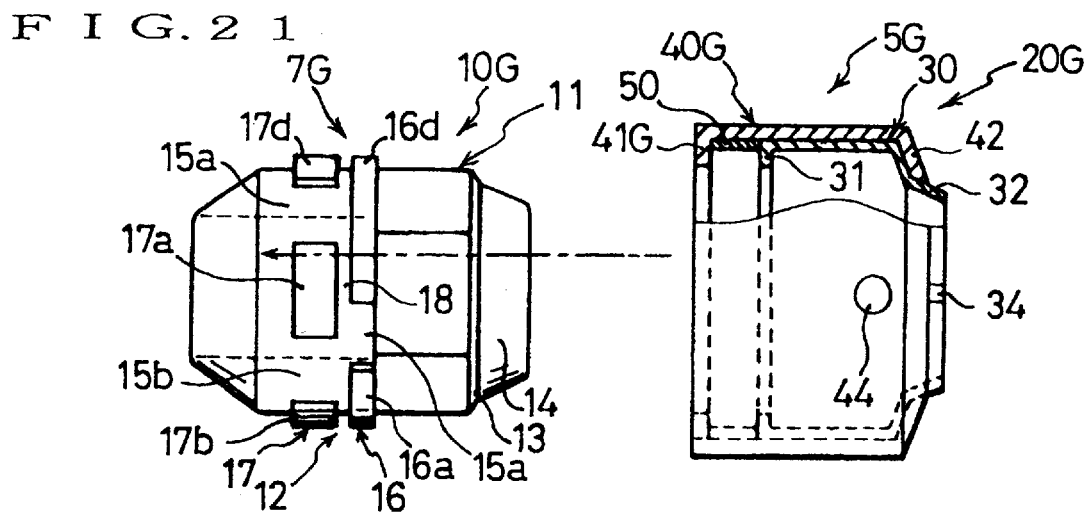
FIG. 21 is a side view of a nut covering device of modification mode 1 wherein the special nut and the cover assembly have been taken apart.
Figure 22:
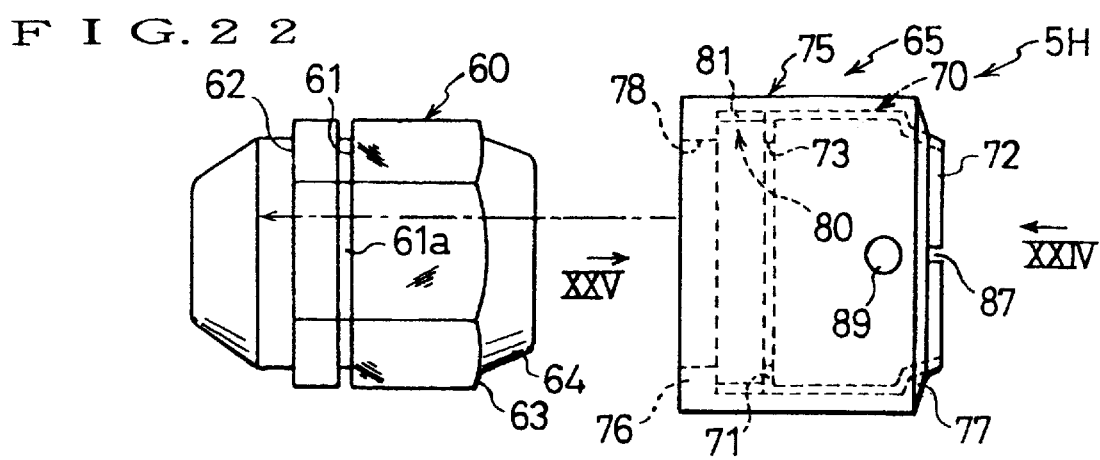
FIG. 22 is a side view of a nut covering device of modification mode 2 wherein the special nut and the cover assembly have been taken apart.
Figure 23:
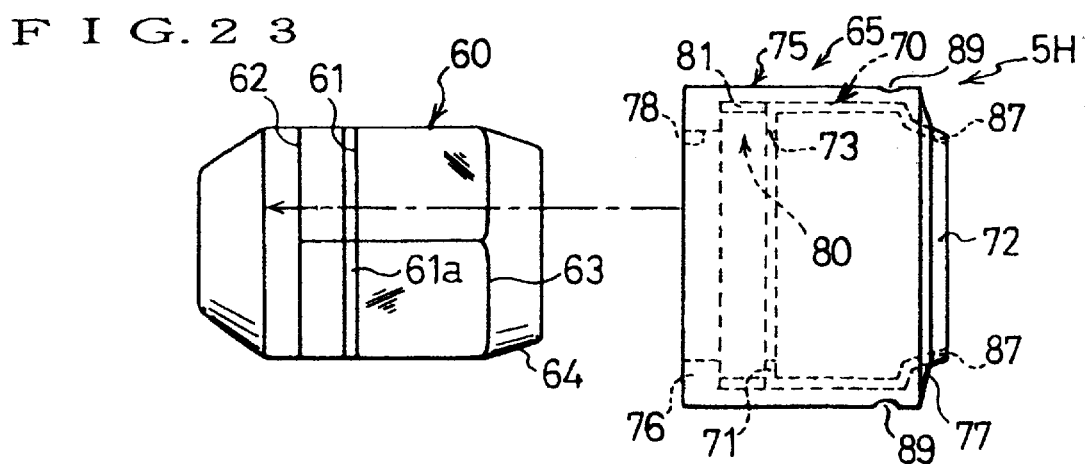
FIG. 23 is a plan view of the covering device of FIG. 22 wherein the special nut and cover assembly have been taken apart.
Figure 24:
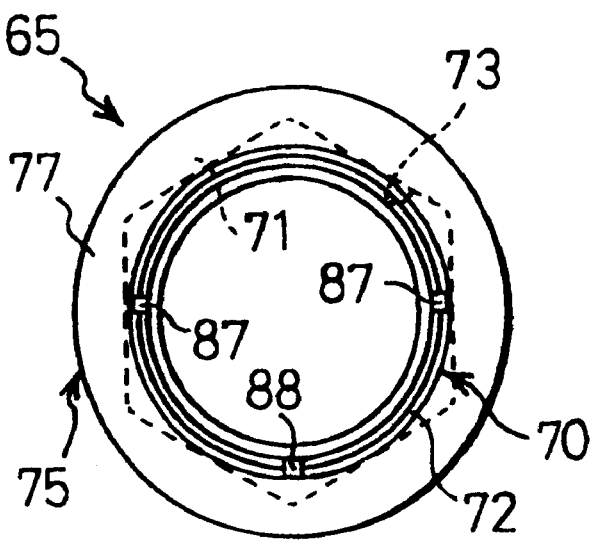
FIG. 24 is a view of FIG. 22 from arrow XXIV.
Figure 25:
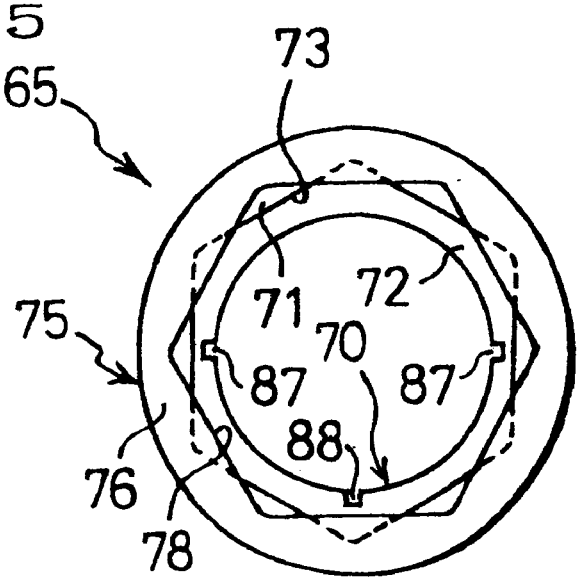
FIG. 25 is a view of FIG. 22 from arrow XXV.
Figure 26:
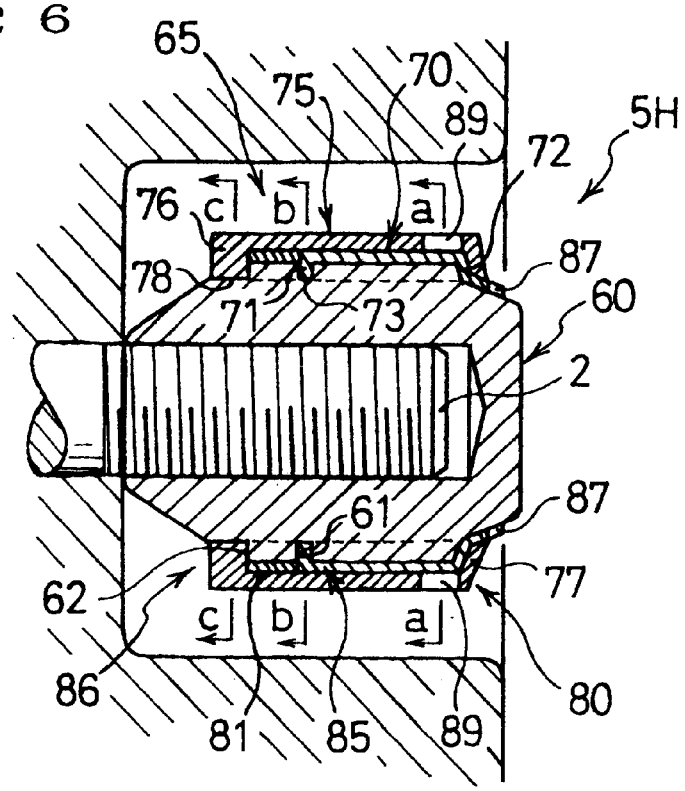
FIG. 26 is a vertical section of the covering device and bolt of FIG. 22.
Figure 27:
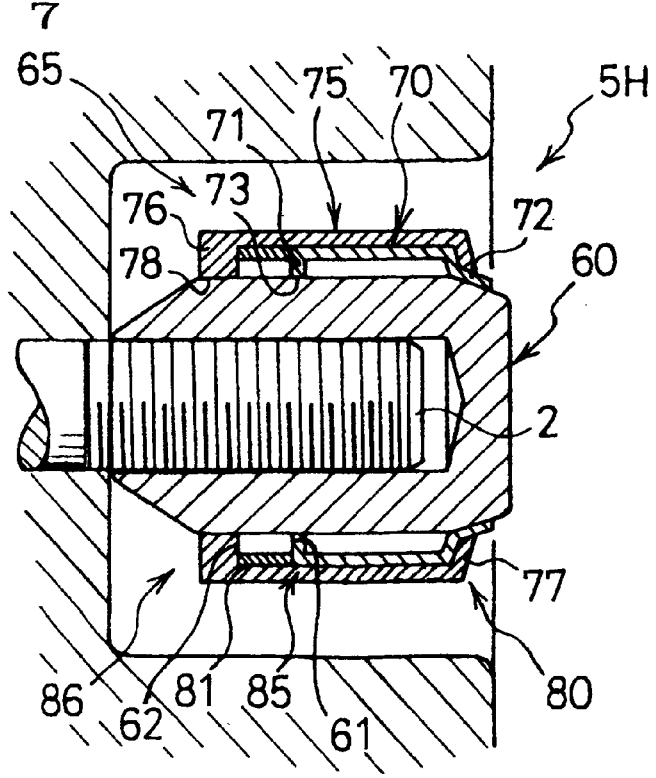
FIG. 27 is a cross section plan view of the covering device and bolt of FIG. 22.
Figure 28:
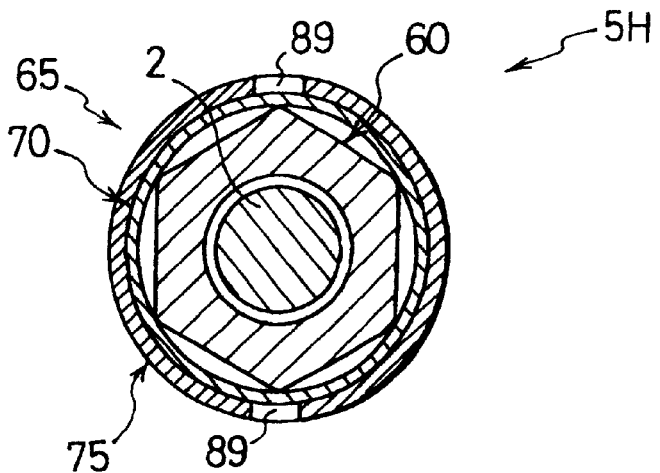
FIG. 28 is a cross section along line a—a of FIG. 26.
Figure 29:
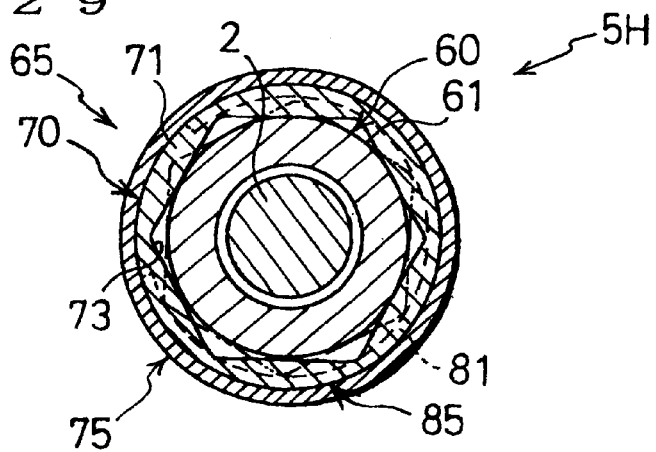
FIG. 29 is a cross section along line b—b of FIG. 26.
Figure 30:
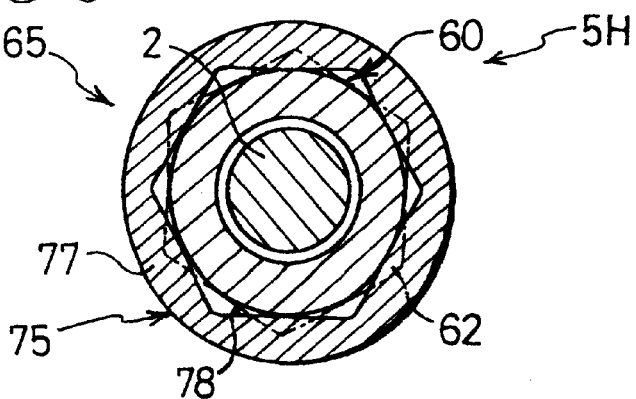
FIG. 30 is a cross section along line c—c of FIG. 26.
Figure 31:
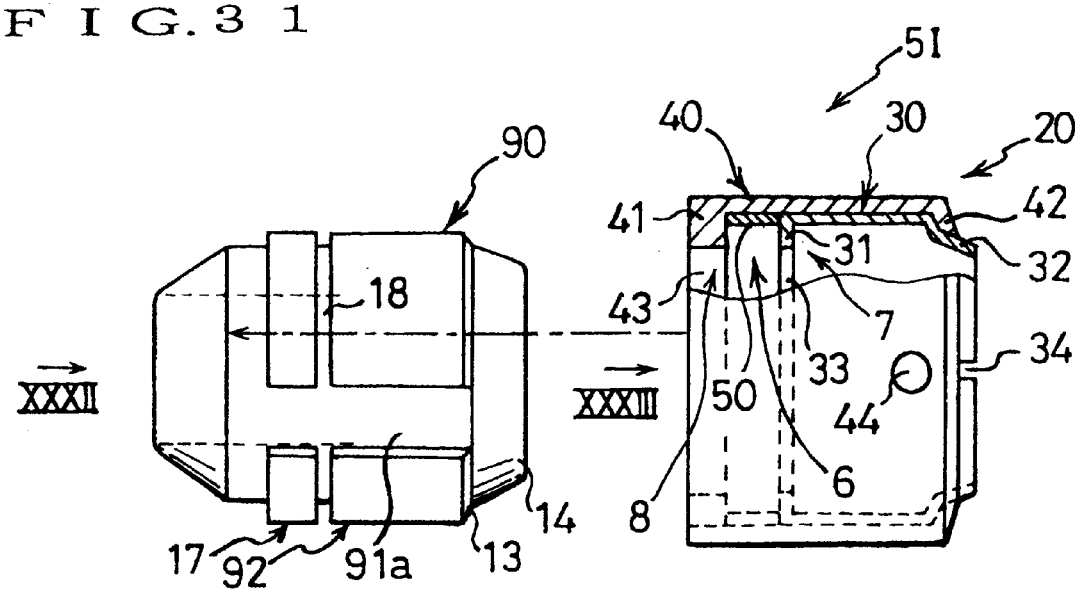
FIG. 31 is a side view of a nut covering device of modification mode 3 wherein the special nut and the cover assembly have been taken apart
Figure 32:
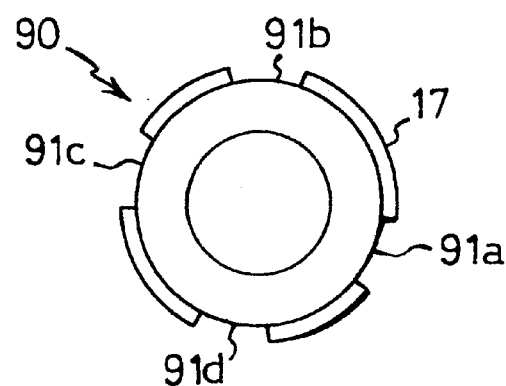
FIG. 32 is a view of FIG. 31 from arrow XXXII.
Figure 33:
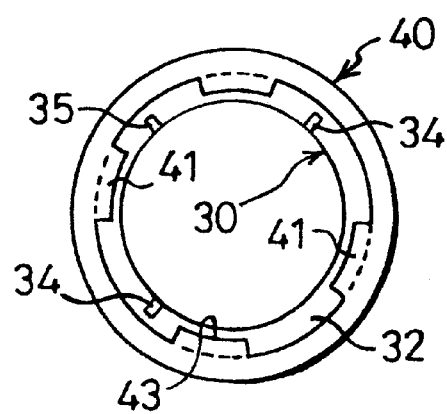
FIG. 33 is a view of FIG. 31 from arrow XXIII.
Figure 34:
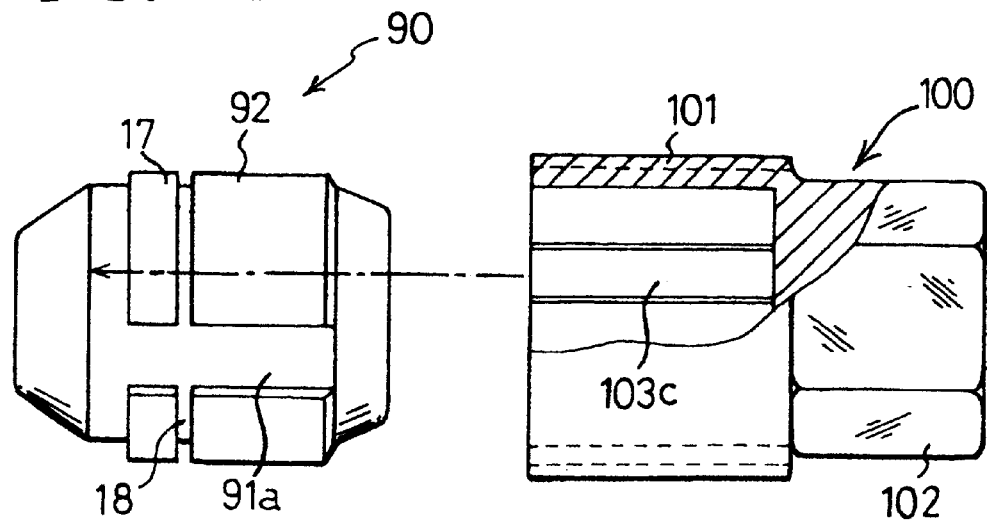
FIG. 34 is a side view of the special nut and wrench tool of FIG. 31.

Modification 1 (FIG. 21)

Referring to FIG. 21, for a special nut 10G of a nut covering device 5G, second stopping part 17 (with four arc-shaped protrusions 17a–17d) and the parts of four notch grooves 15a–15d that correspond to second stopping part 17 are formed at positions in which the phase is shifted by an arbitrary angle theta in the circumferential direction. In order to have third catching part 41G of outer cover 40G fit into engaging groove 18, third catching part 41G is formed with the same thickness as first catching part 31. Second constraining mechanism 7G includes third catching part 41G in addition to the same construction with second constraining mechanism 7. Second constraining mechanism 7G constrains so that there is no movement of outer cover 40G relative to nut 10G in the axis direction. Second constraining mechanism 7G releases the constraint on outer cover 40G when outer cover 40G is at a specified phase with respect to nut 10G.

When attaching cover assembly 20G to nut 10G, once third catching part 41G reaches the position of engaging groove 18, outer cover 40G is rotated the previously mentioned arbitrary angle theta After matching the phase of third catching part 14G with a different specified phase corresponding to second stopping part 17, cover assembly 20G is moved inward. First catching part 31 is matched with engaging groove 18. Third catching part 41G can be engaged with the inner end of second stopping part 17. Finally, inner cover 30 and outer cover 40 are each rotated an arbitrary angle. When removing cover assembly 20G from nut 10G, the previously described steps are conducted in reverse. The rest of the construction is the same as the previously described embodiment, and the description is omitted.

Modification 2 (FIGS. 22–30)

Nut covering device 5H covers a nut member, which screws onto a bolt, and prevents rotation of the nut member. Inner direction and outer direction are defined the same as with the previously described embodiment. Covering device 5H is equipped with the following: a special nut 60; a cover assembly 65, which includes a first constraining mechanism 80; a second constraining mechanism 85; and a third constraining mechanism 86. Nut 60 is a standard hexagon box nut on which an engaging groove 61 and an engaging part 62 are formed. The outer shape of engaging groove 61 has the same size as the outer shape of nut 60. Groove bottom 61a of engaging groove 61 coincides with the planar part of nut 60. On the outer pat of nut 60, there is a step part 63 and a blind wall 64.

Cover assembly 65 has an inner cover 70, an outer cover 75, and a first constraining mechanism 80. Inner cover 70 fits in a rotation capable manner around at least a part of nut 60. The inner diameter of inner cover 70 is slightly larger than the outer diameter of nut 60. A first catching part 71, which fits in engaging groove 61 in order to prevent movement in the axis direction, is formed on the inner end of inner cover 70. A second catching part 72, which contacts and engages with step part 63 and the inclined surface of blind wall 64, is formed on the outer end of inner cover 70. A hexagonal passage hole 73, which has the same outer shape as nut 60 and is capable of having nut 60 pass through with hardly any space, is formed through first catching part 71.

Outer cover 75 fits around inner cover 70 in a manner in which relative rotation is possible. Outer cover 75 is also capable of covering the outer perimeter of nut 60. The inner diameter of outer cover 75 is slightly larger than the outer diameter of inner cover 70. A third catching part 76, which contacts and engages with engaging part 62, is formed on the inner end of outer cover 75. A fourth catching part 77, which contacts and engages with second catching part 72, is formed on the outer end of outer cover 75.

A hexagonal passage hole 78, which has the same outer shape as nut 60 and is capable of having nut 60 pass through with hardly any space, is formed through third catching part 76.

First constraining mechanism 80 constrains so that outer cover 75 does not move in the axis direction relative to inner cover 70. First constraining mechanism 80 hat the following: second catching part 72; fourth catching part 77; and a constraining member 81 (equivalent to constraining part), which constrains so that outer cover 75 does not move in the axis direction with respect to inner cover 70.

Second constraining mechanism 85 constrains so that inner cover 70 does not move in the axis direction relative to nut 60. Second constraining mechanism 85 is equipped with engaging groove 61, first catching part 71, and second catching part 72.

Third constraining mechanism 86 constrains so that, in the axis direction, outer cover 75 at least does not move in the removal direction relative to nut 60. Third constraining mechanism 86 is equipped with third catching part 76 and engaging part 62.

With covering device 5H, the constraints of second and third constraining mechanisms 85, 86 are released by matching the circumferential phase of inner cover 70 and outer cover 75 with respect to nut 60 to a specified phase that has been determined in advance. Cover assembly 65 can then be removed from nut 60.

Because there are six phases every sixty degrees in which nut 60 can pass through passage hole 73 of inner cover 70, the specified phase of inner cover 70 with respect to nut 60 occurs at six positions in one circumference. When inner cover 70 is not at the specified phase, first catching part 71 is stopped by engaging groove 61 so that motion in the axis direction is impossible. At this time, second catching part 72 is in contact with the outer end surface (step part 63 and inclined wall of blind wall 64) of nut 60. Similarly, because there are six phases every sixty degrees in which nut 60 can pass through passage hole 78 of outer cover 75, the specified phase of outer cover 75 with respect to nut 60 occurs at six positions in one circumference. When outer cover 75 is not in the specified phase, third catching part 76 is stopped by engaging part 62. At this time, fourth catching part 77 is in contact with and engaged to second catching part 72. On the end part of second catching part 72 of inner cover 70, a pair of notches 87 and a V-notch 88 are formed. A pair of operational holes 89 is formed on the tube wall of outer cover 75.

As in the previously described embodiment, there are indicator marks, including arrow marks, on the outer end surface of nut 60. As in the previously described embodiment, there are indicator marks, including arrow marks, on the outer end surface of outer cover 75.

When attaching cover assembly 65 to nut 60, inner cover 70 and outer cover 75 are matched to one of the specified phases, and cover assembly 65 is then attached to nut 60. After matching first catching part 71 with engaging groove 61 and matching third catching part 76 with engaging part 62, inner cover 70 and outer cover 75 are each rotated an arbitrary angle. Thereupon, first catching part 71 is stopped by engaging groove 61, and third catching part 76 is stopped by engaging part 62. As with the previously described embodiment, when removing cover assembly 65 from nut 60, while referring to the specified phase relationship described in the manual and the like, inner cover 70 and outer cover 75 are matched to the specified phase using operational tools. Cover assembly 65 can then be removed from nut 60.

Modification 3 (FIG. 31–34)

Instead of special nut 10 as in cover device 5, nut covering device 5I is equipped with a special nut 90 and a wrench tool 100, which rotates special nut 90. Nut 90 does not have nut body 11 as in nut 10. In addition, nut 90 has four notch grooves 91a–91d and a first stopping part 92, which are formed by extending outward notch grooves 15a–15d and first stopping part 16. Wrench tool 100 has a tube part 101 and a hexagon part 102. On the inner surface of tube part 101, four protrusions (103a–103d) (however only protrusion 103c is shown), which correspond to four notch grooves 91a–91d respectively, are formed. While fitting tube part 101 on nut 90, nut 90 can be tightened or loosened via wrench tool 100 with a standard box wrench. The other construction is basically the same as the previously Described cover device 5, and therefore, the same numerals are used, and explanation will be omitted.

Figure 35:
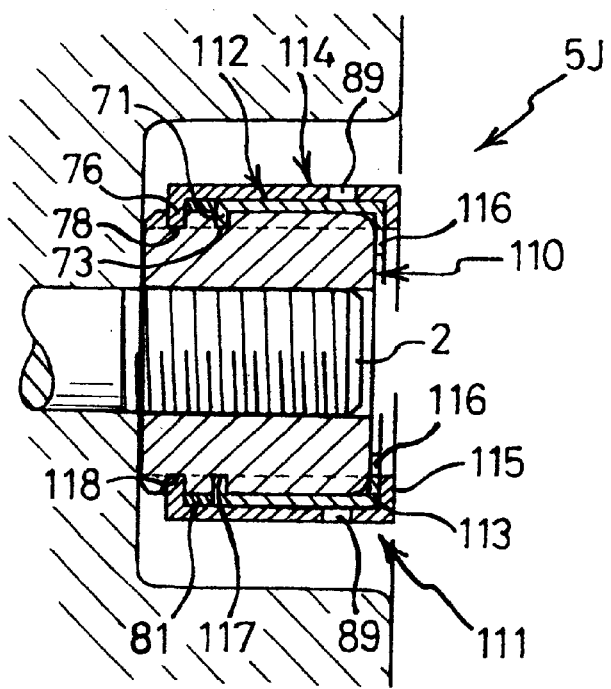
FIG. 35 is a vertical section of a nut covering device of modification mode 4.

Modification 4 (FIG. 35)

Instead of nut 60 of covering device 5H, nut covering device 5J has a hexagonal nut 110, which has a through screw hole and a pair of engaging grooves 117, 118. Nut covering device 5J also has a cover assembly 111, in which a portion of cover assembly 65 is modified. With cover assembly 111, second catching part 113 of inner cover 112 engages with the outer perimeter part of the outer end surface of nut 110. Fourth catching part 115 of outer cover 114 engages with the outer perimeter part of outer end surface of second catching part 113. A pair of notches 116 and a V notch (not shown) are formed on second catching part 113 without covering fourth catching part 115. As in the previously described embodiment, indicator marks, including arrow marks, are stamped by a die on the outer end surface of nut 110. As in the previously described embodiment, indicator marks, including arrow marks, are stamped by a die on the outer end surface of outer cover 112. The other construction is basically the same as the previously described covering device 5H, and therefore, the same numerals are used, and the explanation will be omitted.

Figure 36:
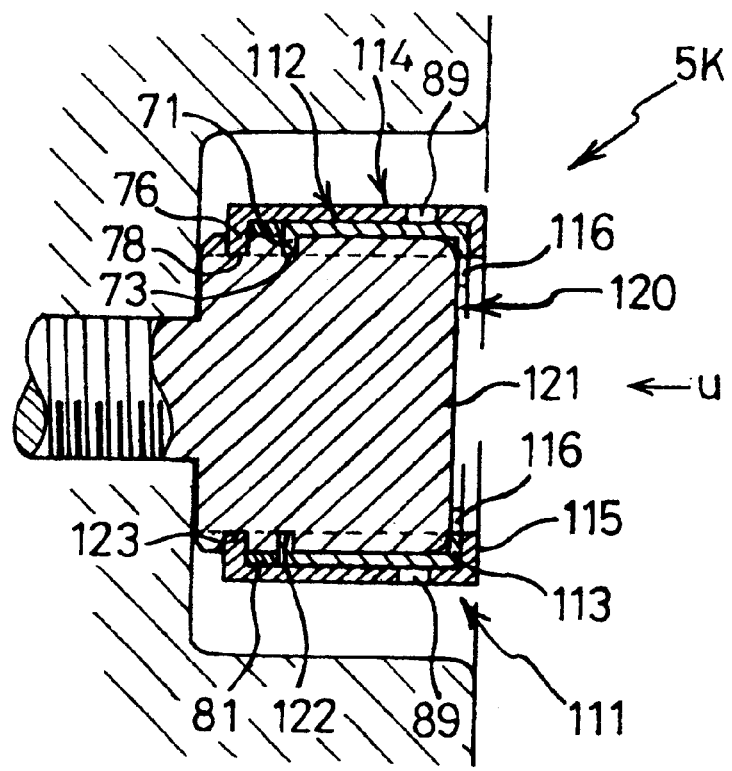
FIG. 36 is a vertical section of a bolt head covering device of modification mode 5.
Figure 37:
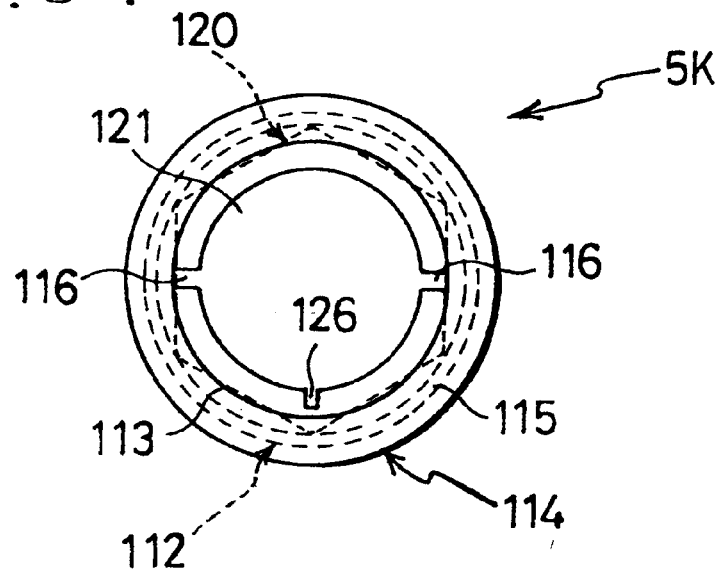
FIG. 37 is a view of FIG. 36 from arrow u.
Figure 38:
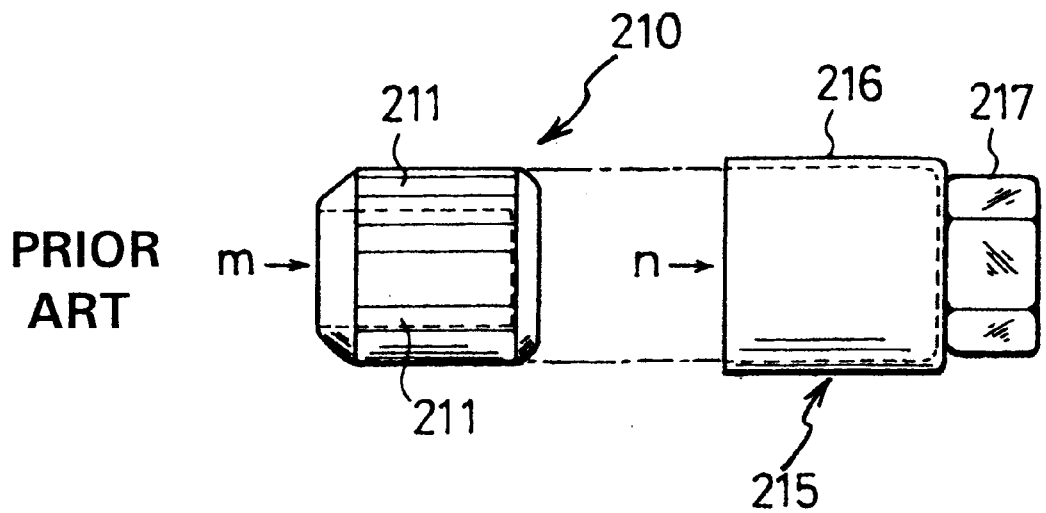
FIG. 38 is a side view of a special nut and wrench tool of the prior art.
Figure 39:
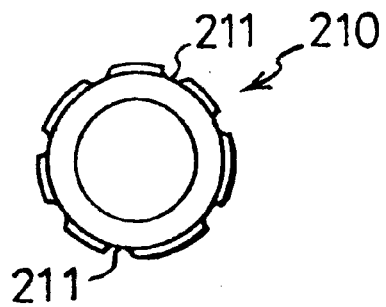
FIG. 39 is a view of FIG. 38 from arrow m.
Figure 40:
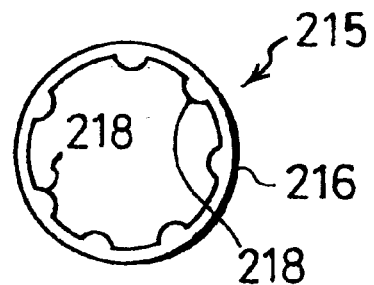
FIG. 40 is a view of FIG. 38 from arrow n.

Modification 5 (FIG. 36, FIG. 37)

This bolt head covering device 5K covers the head part of a bolt and prevents its rotation. Instead of nut 110 of covering device 5J, covering device 5K is attached to a head part 121 of a bolt 120 in a detachable condition. Instead of engaging grooves 117, 118, a pair of engaging grooves 122, 123 are formed on head part 121 of bolt 120 and have the construction as shown. The other construction is basically the same as the previously described covering device 5J, and therefore, the same numerals are used, and the explanation will be omitted.

Having described preferred embodiments of the present invention with reference to the accompanying drawings, it is to be understood that the invention is not limited, to those precise embodiments, and that various changes and modifications may be effected therein by one skilled in the art without departing from the scope or spirit of the invention as defined in the appended claims.

For example, the inner cover can be constructed by combining a plurality of metal parts. The outer cover can be constructed by combining a plurality of metal parts. In these situations, the plurality of metal parts can be combined by a fastening mechanism such as weld joints or screw mechanisms.

Furthermore, the cross-sectional shape of the entry part of the nut is not limited to hexagonal shape or cylindrical shapes. They can be other polygons other than hexagons, such as squares or pentagons, and they can be used in the same way for the present invention. Furthermore, besides fastening tools (nuts and bolts) for attaching a wheel, the present invention can be used for nuts and bolts as fastening tools for fastening other various members or parts.

What is claimed is:

1. A nut covering device for covering a nut member screwed onto a bolt, in order to prevent rotation of said nut member, comprising:
    a cover assembly, comprising: an inner cover, fitting around, in a rotatable manner, at least a portion of said nut member; an outer cover, fitting around said inner cover in a manner allowing for relative rotation and covering an outer perimeter of said nut member; and a first constraining mechanism, which constrains so that there is no relative motion of said outer cover with respect to said inner cover in an axis direction;
    a second constraining mechanism, which constrains so that there is no relative motion of said inner cover with respect to said nut member in said axis direction;
    a third constraining mechanism, which constrains so that there is no relative motion of said outer cover with respect to said nut member in said axis direction in at least a direction of removal;
    said nut covering device being constructed so that said cover assembly is detachable from said nut member by releasing said second and third constraining mechanisms by matching a circumferential phase of said inner cover and said outer cover with respect to said nut member with a pre-determined specified phase.

2. A nut covering device as described in claim 1, wherein:
    said nut member having an inner direction being a direction in which said nut member is tightened;
    said nut member having an outer direction being a direction in which said nut member is loosened;
    said nut member having a hexagonal nut body on an outer part of said nut member, and a stopping body, which is formed more inward than said nut body;
    said stopping body having: a plurality of notch grooves, formed on an outer perimeter towards the bolt axis, being irregular in at least one of their circumferential widths and their circumferential spacings; a first stopping part, comprising a plurality of arc-shaped protrusions which are segmented by said plurality of notch grooves; a second stopping part comprising a plurality of arc-shaped protrusions which are formed more inward than said first stopping part and are segmented by said plurality of notch grooves; an engaging groove, which is formed between said first stopping part and said second stopping part and is approximately circular.

3. A nut covering device as described in claim 2, wherein:
    said second constraining mechanism has said first stopping part said second stopping part, said engaging groove, a first catching part on an inner end part of said inner cover engaging with said engaging groove in a rotatable manner, and a second catching part on an outside end part of said inner cover engaging with an outside end surface of said nut member;
    a passage hole, which has essentially the same outer shape as the outer shape of said stopping body of said nut member and through which said stopping body is capable of passing, is formed through said first catching part.

4. A nut covering device as described in claim 3, wherein:
    said third constraining mechanism has said second stopping part and a third catching part, which is formed on an inner end part of said outer cover and engages with said second stopping part in a rotatable manner;
    a passage hole, which has approximately the same outer shape as the outer shape of said stopping body of said nut member and through which said stopping body is capable of passing, is formed through said third catching part.

5. A nut covering device as described in claim 4, wherein:
    said first constraining, mechanism has: said second catching part; a fourth catching part on an outside end of said outer cover engaging with an outside end surface of said second catching part of said inner cover; and a constraining part which constrains so that there is no relative motion in an outward direction of said outer cover with respect to said inner cover.

6. A nut covering device as described in claim 5, wherein:
    a pair of notches for rotating said inner cover from the exterior is formed on an outside end part of said inner cover.

7. A nut covering device as described in claim 6, wherein:
    a pair of operational holes for rotating said outer cover from the exterior is formed on said outer cover.

8. A nut covering device as described in claim 7, wherein:
    a plurality of indicator marks are stamped on an outside end surface of said nut member;
    a plurality of indicator marks are stamped on an outside end surface of said fourth catching part of said outer cover;
    at least one indicator mark or an indicator mark equivalent is on an outside end part of said inner cover.

9. A nut covering device as described in claim 8, wherein:
    said nut member is a nut for fastening a wheel to a wheel support member of a vehicle.

10. A nut covering device as described in claim 1, wherein:
    said nut member is a hexagon nut or a box nut;
    said second constraining mechanism is equipped with: said first catching part formed on said inner cover; a first passage hole which is formed through said first catching part and has the same outer shape as the outer shape of said nut member and through which said nut member is capable of passing; an engaging groove which is formed on said nut member and with which said first catching part engages so that there is no relative motion of said first catching part with respect to said nut member in said axis direction; and a second catching part on an outside end part of said nut member engaging with an outside end surface of said nut member.

11. A nut covering device as described in claim 10, wherein:

said third constraining mechanism is equipped with: a third catching part, which is formed through an inner end part of said outer cover; a second passage hole, which is formed on said third catching part and has the same outer shape as the outer shape of said nut member and through which said nut member is capable of passing; and a stopping part which is formed near an inside end part of said nut member and with which said third catching part engages in order to prevent relative motion in an outward direction of said third catching part with respect to said nut member.

12. A nut covering device as described in claim 11, wherein:

said first constraining mechanism has: said second catching part; a fourth catching part on an outside end part of said outer cover engaging with an outside end surface of said second catching part of said inner cover; a constraining part, which constrains to prevent relative motion in an outward direction of said outer cover with respect to said inner cover.

13. A nut covering device for covering a nut member screwed onto a bolt, in order to prevent rotation of said nut member, comprising:

a cover assembly, comprising: an inner cover, which fits around, in a rotatable manner, at least a portion of said nut member; an outer cover, which fits around said inner cover in a manner allowing for relative rotation and can cover an outer perimeter of said nut member; and a first constraining mechanism, which constrains so that there is no relative motion of said outer cover with respect to said inner cover in an axis direction;

a second constraining mechanism, which constrains so that there is no relative motion of said inner cover with respect to said nut member in said axis direction;

a third constraining mechanism, which constrains so that there is no relative motion of said outer cover with respect to said nut member in said axis direction in at least a direction of removal;

said second constraining mechanism is constructed so that, when said inner cover matches a specified phase with respect to said nut member, said constraint on said inner cover is released;

said third constraining mechanism is constructed so that, when said phase of said outer cover with respect to said nut member is matched to a second specified phase which is different from said specified phase, said constraint on said outer cover is released.

14. A bolt head covering device for covering a head of a bolt and preventing rotation of said head bold, comprising:

a cover assembly, comprising: an inner cover, which fits around, in a rotatable manner, at least a portion of said bolt head; an outer cover, which fits around said inner cover in a manner allowing for relative rotation and which can cover an outer perimeter of said bolt head; and a first constraining mechanism, which constrains so that there is no relative motion of said outer cover with respect to said inner cover in an axis direction;

a second constraining mechanism, which constrains so that there is no relative motion of said inner cover with respect to said bolt head in said axis direction;

a third constraining mechanism, which constrains so that there is no relative motion of said outer cover with respect to said bolt head in said axis direction in at least a direction of removal;

said bolt head covering device is constructed so that said cover assembly is detachable from said bolt head by releasing said second and third constraining mechanisms by matching a circumferential phase of said inner cover and said outer cover with respect to said bolt head with a predetermined specified phase.

* * * * *